United States Patent [19]

Dolan et al.

[11] Patent Number: 4,994,722
[45] Date of Patent: Feb. 19, 1991

[54] AUTOMATED DOOR LOCKING SYSTEM FOR AIRCRAFT LAVATORY

[75] Inventors: David C. Dolan, Seattle, Wash.; Jimmie L. Grimes, Maryland, Mo.; David C. Broman, Seattle; Kwan-Ho Bae, Lynnwood, both of Wash.

[73] Assignee: The Boeing Company, Seattle, Wash.

[21] Appl. No.: 415,891

[22] Filed: Oct. 2, 1989

[51] Int. Cl.⁵ .................. B64C 19/02; G05B 24/02
[52] U.S. Cl. ...................... 318/480; 70/DIG. 51; 244/129.5; 292/DIG. 25; 340/542; 340/555; 340/565
[58] Field of Search ............ 318/480; 307/117; 340/541, 542, 543, 545, 555, 556, 557, 565; 292/DIG. 3, DIG. 4, DIG. 21, DIG. 25, DIG. 32, DIG. 41, DIG. 68; 244/129.4, 129.5; 70/91, 92, 95, 145, 271, 274, 275, 277, DIG. 30, DIG. 51, DIG. 59; 49/141

[56] References Cited

U.S. PATENT DOCUMENTS

| 2,237,658 | 4/1941 | Dyke | 292/1 |
| 2,519,386 | 8/1950 | Loving | 244/129 |
| 2,665,129 | 1/1954 | Durbin et al. | 268/66 |
| 3,753,316 | 8/1973 | Savarieau et al. | 49/31 |
| 4,009,476 | 2/1977 | Lutz | 343/7 |
| 4,101,886 | 7/1978 | Grimes et al. | 165/14 |
| 4,415,893 | 11/1983 | Roland et al. | 340/543 X |
| 4,458,446 | 7/1984 | Mochida et al. | 49/28 |
| 4,560,912 | 12/1985 | Jonsson | 318/480 |
| 4,577,437 | 3/1986 | Gionet et al. | 318/480 X |
| 4,590,410 | 5/1986 | Jonsson | 318/480 |
| 4,652,862 | 3/1987 | Verslycken | 70/92 X |
| 4,742,245 | 5/1988 | Yoshida et al. | 307/117 X |

FOREIGN PATENT DOCUMENTS

| 52-55498 | 5/1977 | Japan | 340/543 |
| 8401404 | 4/1984 | PCT Int'l Appl. | 244/129.5 |

Primary Examiner—Bentsu Ro
Attorney, Agent, or Firm—E. F. Harasek; B. A. Donahue

[57] ABSTRACT

A system for automatically locking a lavatory door on an aircraft from a remote location comprises means for activating the system, means for sensing the presence of a person in the lavatory, means for locking the lavatory when it is unoccupied and means for selectively overriding the system to allow entry by authorized personnel.

1 Claim, 4 Drawing Sheets

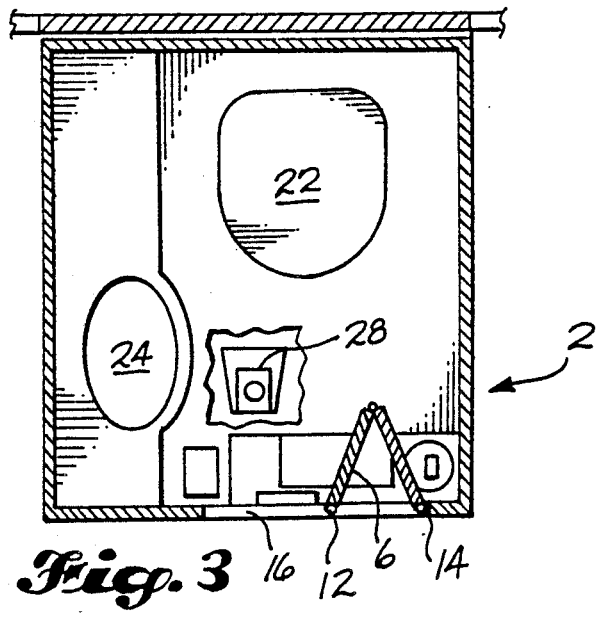
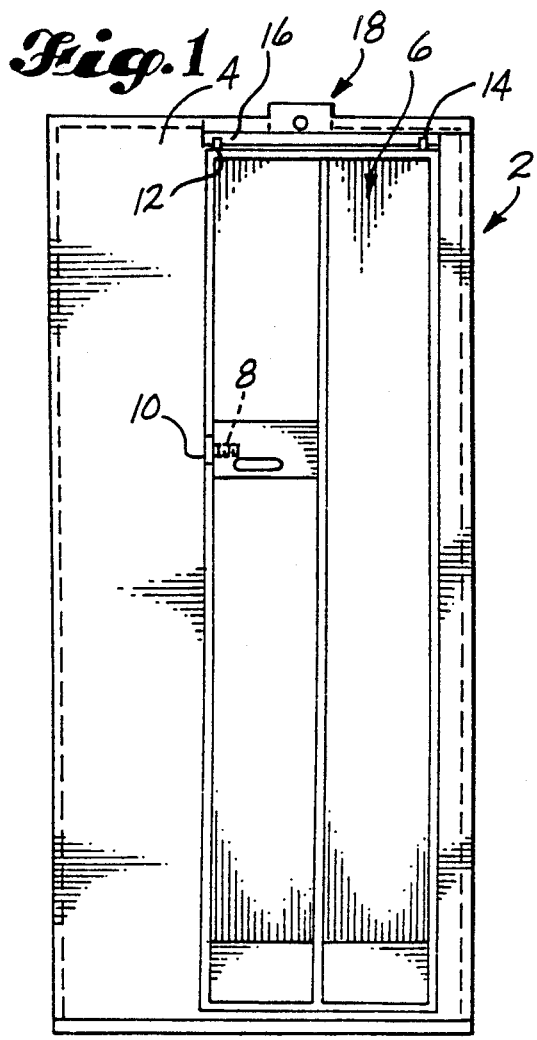
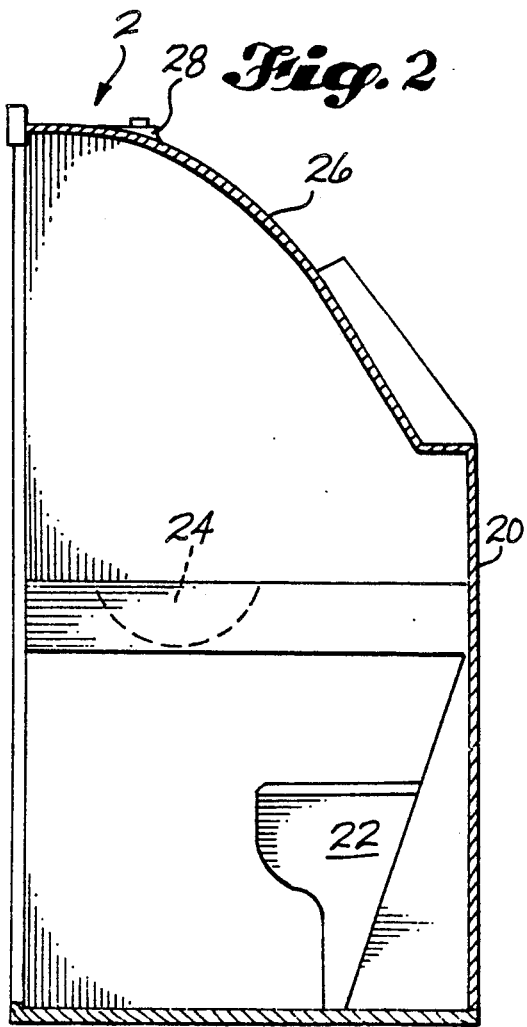

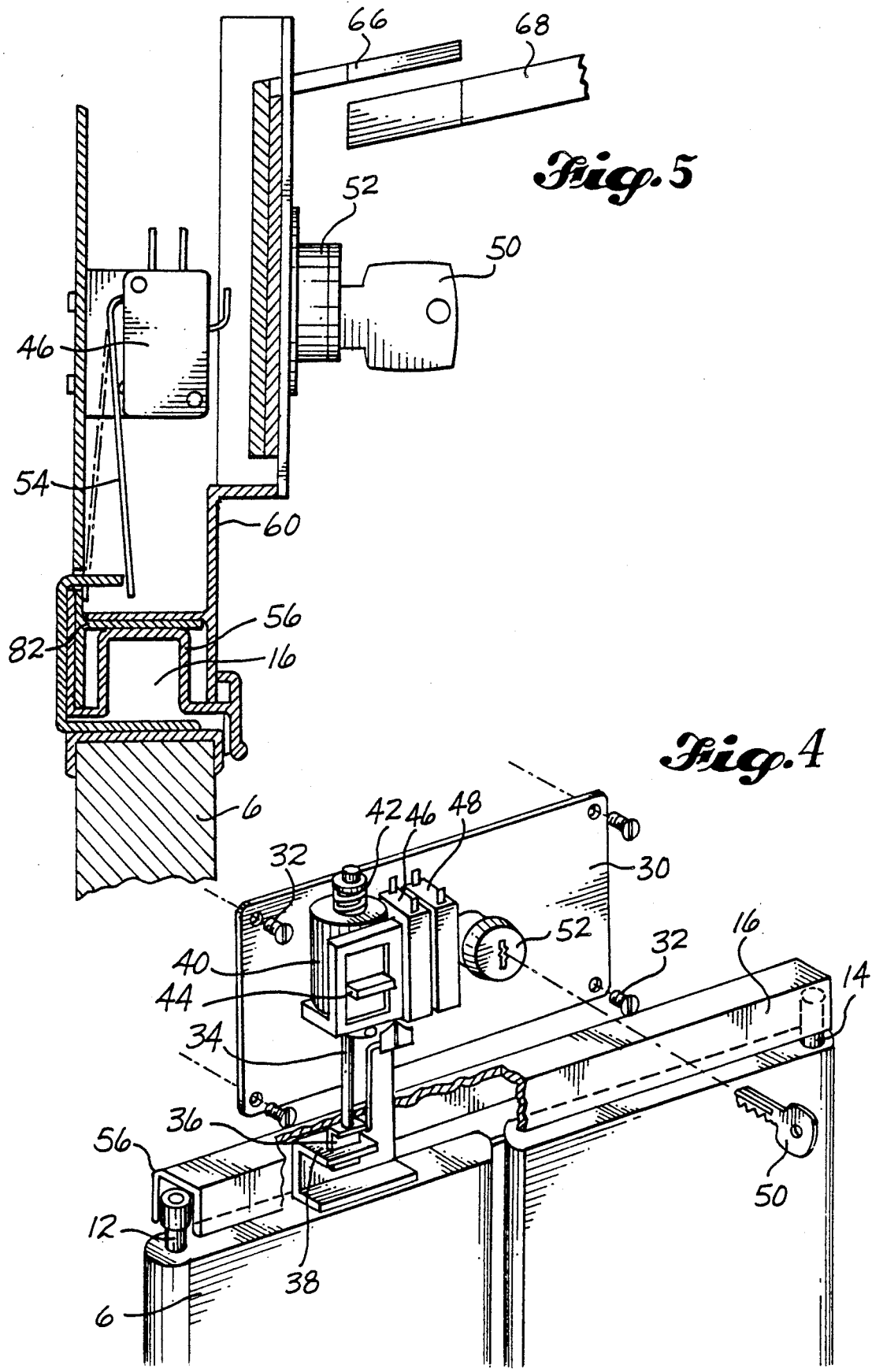

AUTOMATED DOOR LOCKING SYSTEM FOR AIRCRAFT LAVATORY

This invention relates to an automated system for locking an aircraft lavatory door from a remote location to reserve it for crew use.

BACKGROUND

In some large commercial passenger aircraft, a lavatory is provided solely for crew use so they do not have to wait in line. However, this lavatory takes floor space which could be used for seats for paying passengers. Therefore, means have been sought for eliminating the crew lavatory without inconveniencing either crew or passengers.

One viable solution is for the crew to selectively lock one of the passengers' lavatory doors from the cockpit or a flight attendants' station and allow access to it by key entry only. Passengers could then use one of the other lavatories with little or no inconvenience and the crew could use the locked lavatory without waiting. However, a suitable locking system must prevent a passenger's being inadvertently locked in the lavatory without invading his privacy.

A number of automatic locking systems were considered, but none was deemed acceptable. For example, a broken light beam detector was not reliable because people might avoid breaking the beam and cabin pressurization cycles could mislocate the beam with respect to the receiver. Pressure pads in the lavatory floor are unreliable for lightweight passengers. Not all passengers lock the door when they enter a lavatory, so sensing a locked door only could possibly trap someone inside.

This invention solves the problem by an externally activated door locking system incorporating a heat and motion sensor and an electronic logic circuit controlling a secondary door lock.

BRIEF SUMMARY

In accordance with a preferred embodiment, a lavatory door locking system is provided which is actuated by a crew member from the cockpit or elsewhere in the aircraft. Once activated, a specially adapted electrical circuit uses a heat and/or motion sensor located in the lavatory to determine whether it is in use. If it is not in use and the door is closed, a secondary door lock is activated bolting the door shut and the occupied sign is lit. Until the automatic system is turned off by the crew, a key or other means is required to unlock the door. If a person is in the lavatory when the automatic system is turned on, the system recycles every few seconds until the presence of the person is no longer sensed and the door has been shut. Only then is the door bolted shut at the secondary lock.

FIGURES

The invention will be better understood in terms of the several figures in which:

FIG. 1 is a front view of an aircraft lavatory having bifold doors and a locking system in accordance with the invention.

FIG. 2 is a side sectional view of the lavatory of FIG. 1.

FIG. 3 is a plan view, partly in section, of the lavatory of FIG. 1 showing the bifold door open and the heat and motion sensor in the ceiling.

FIG. 4 is a front view of a locking mechanism at the top of a lavatory bifold door in accordance with the invention showing the bolt extended (locked) into the door top channel.

FIG. 5 is a sectional side view of the locking mechanism of FIG. 4 showing a door contact reed switch which senses the position of the door.

DETAILED DESCRIPTION

Figures 6, 7:
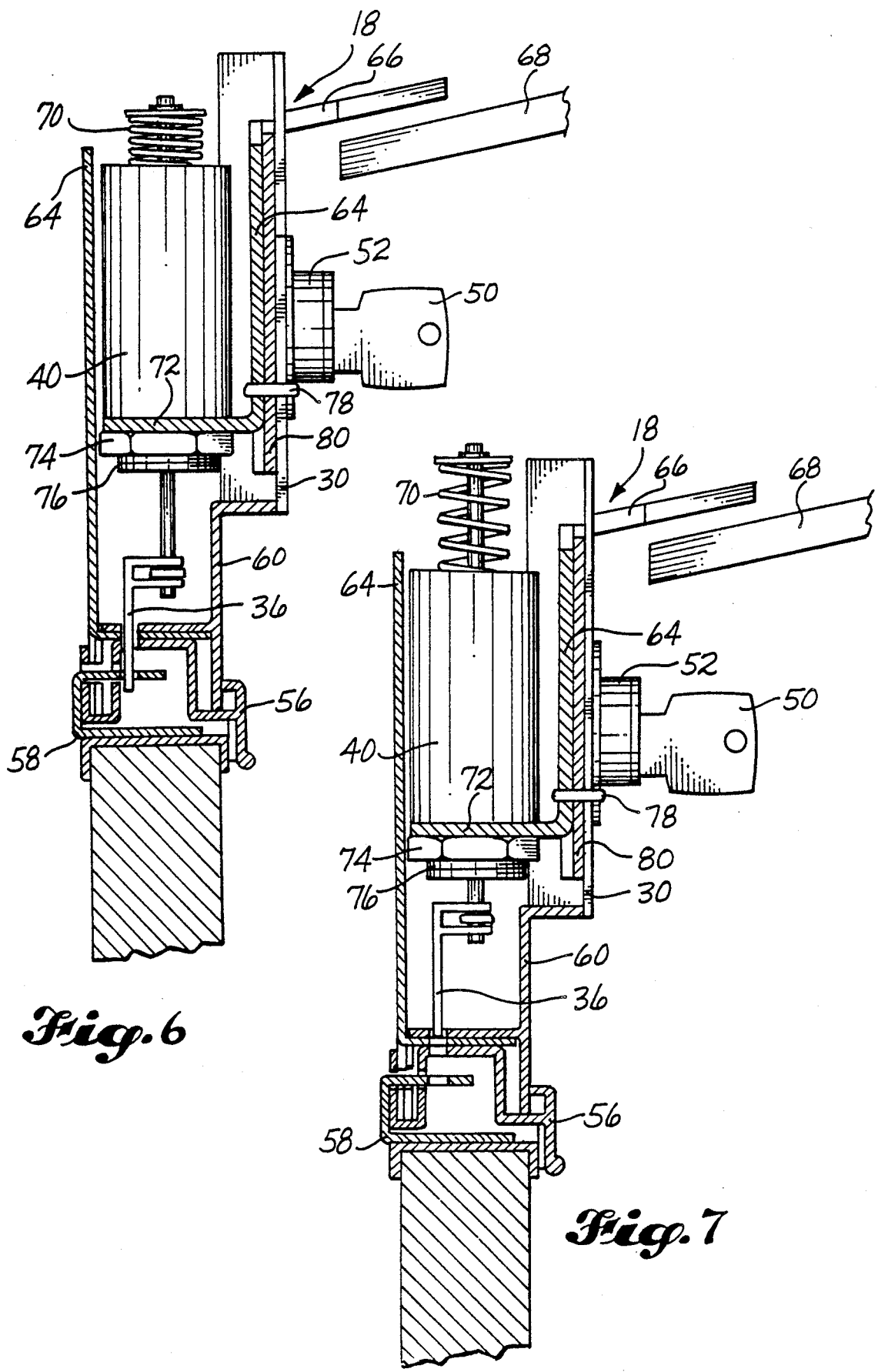
FIG. 6 is a side sectional view of the locking mechanism of FIG. 4.
FIG. 7 is like FIG. 6 with the bolt in the retracted (unlocked) position.

Our invention will be better understood in view of the following detailed description of a preferred embodiment thereof. FIG. 1 is a front view of an airline lavatory module 2. Preferably, this lavatory is the one closest to the cockpit. Lavatory 2 comprises a fixed front wall 4 with a bifold door 6 which can be locked from the inside by sliding bolt 8 in the handle plate 7 into a strike 10 in fixed wall 4 when the door is closed. This also lights the lavatory occupied sign (not shown). Pins 12 and 14 on either side of the top of bifold door 6 travel in track 16 located near the top of lavatory 2. Locking mechanism 18 of this invention is located above bifold door 6, although its location could be moved to the side, bottom or elsewhere on the door edge if desired.

FIG. 2 is a side sectional view of the interior of lavatory 2 showing back wall 20, commode 22 and sink 24. Ceiling 26 of lavatory 2 slopes downward from front wall 4 of the unit towards back wall 20. Heat and motion sensor 28 is mounted in ceiling 26. Sensor 28 is positioned in the top of unit 2 so that the area within its generally cone-shaped range will encompass anyone within the lavatory. A sensor which detects both heat and motion is preferred so the system will not be operative when only heat or only motion is sensed. Some heat and motion sensors can be fooled when a person remains perfectly still for several seconds. However, the subject system is such that the automatic door lock will be unlocked when motion is again sensed. FIG. 3 shows heat and motion sensor 28 in a cutaway plan view of lavatory 2 as it is mounted in ceiling 26.

FIG. 4 is a more detailed view of a locking mechanism 18 in accordance with the invention. The locking mechanism is secured to face plate 30. Bolts 32 fasten plate 30 to the bulkhead of the airplane (not shown) directly above bifold door 6. As seen in the cutaway section of door track or channel 16, door 6 is locked by the extension of bolt 34 and lock plate 36 into strike plate 38 attached to the top of bifold door 6. Door 6 is locked by energizing door lock solenoid 40 so that spring 42 is compressed and bolt 34 moves downward. Manual solenoid lock override slide 44 is attached to solenoid 40 so that bolt 34 can be manually pulled upwards and out of door channel 16, if desired. Door contact switch 46 and key override switch 48 are located next to solenoid 40. Door contact switch 46 senses whether door 6 is closed. Key override switch 48 deenergizes solenoid 40 when key 50 is turned in barrel 52, withdrawing lock plate 36 from strike plate 38. Face plate 30 and its attached elements are above door 6 and out of the line of sight of a passenger so their presence is not apparent.

FIG. 5 shows a sectional side view of FIG. 4 between door contact switch 46 and key override switch 48. In particular, reed 54 of door contact switch 46 is shown in the door closed position. Switch 46 is shown as it would be in the open position in broken lines.

Door pins 12 and 14 slide in channel 16 created by flange 56 adjacent door channel molding 58. The front of flange 56 serves both decorative and functional purposes. It conceals the top of bifold door 6 and is biased against fixed front piece 60 above door 6. Front piece 60 wedges rear mounting plate 62 for switches 46 and 48 between itself and flange 56. Backing plate 64 behind face plate 30 has a top section 66 which overhangs the airplane's cabin ceiling 68. Lock barrel 52 is mounted through face plate 30 and backing plate 64.

FIGS. 6 and 7 are sectional side views of the locking mechanism showing particularly solenoid 40 and bolt lock plate 36 in the door locked--system engaged, and door unlocked--system unengaged, positions respectively. In the door locked position, energized solenoid 40 compresses spring 70 which lowers bolt 34. Accordingly, the system fail mode where no voltage is applied to solenoid 40 leaves the system in the unlocked position as seen particularly in FIG. 7. This is preferred for safety reasons. Solenoid 40 is mounted through lower extension 72 of backing plate 64 and secured in place by nut 74 screwed on to the solenoid locating threads 76. Slide plate pin release button 78 extends through face plate 30, reinforcing plate 80 and backing plate 64 for quick release of entire locking mechanism 18. Strike plate 38 is mounted on top of bifold door 6 where bolt lock plate 36 extends through door channel 16. Lock plate 36 itself is fastened to the bolt by locating flange 82.

Figure 8:
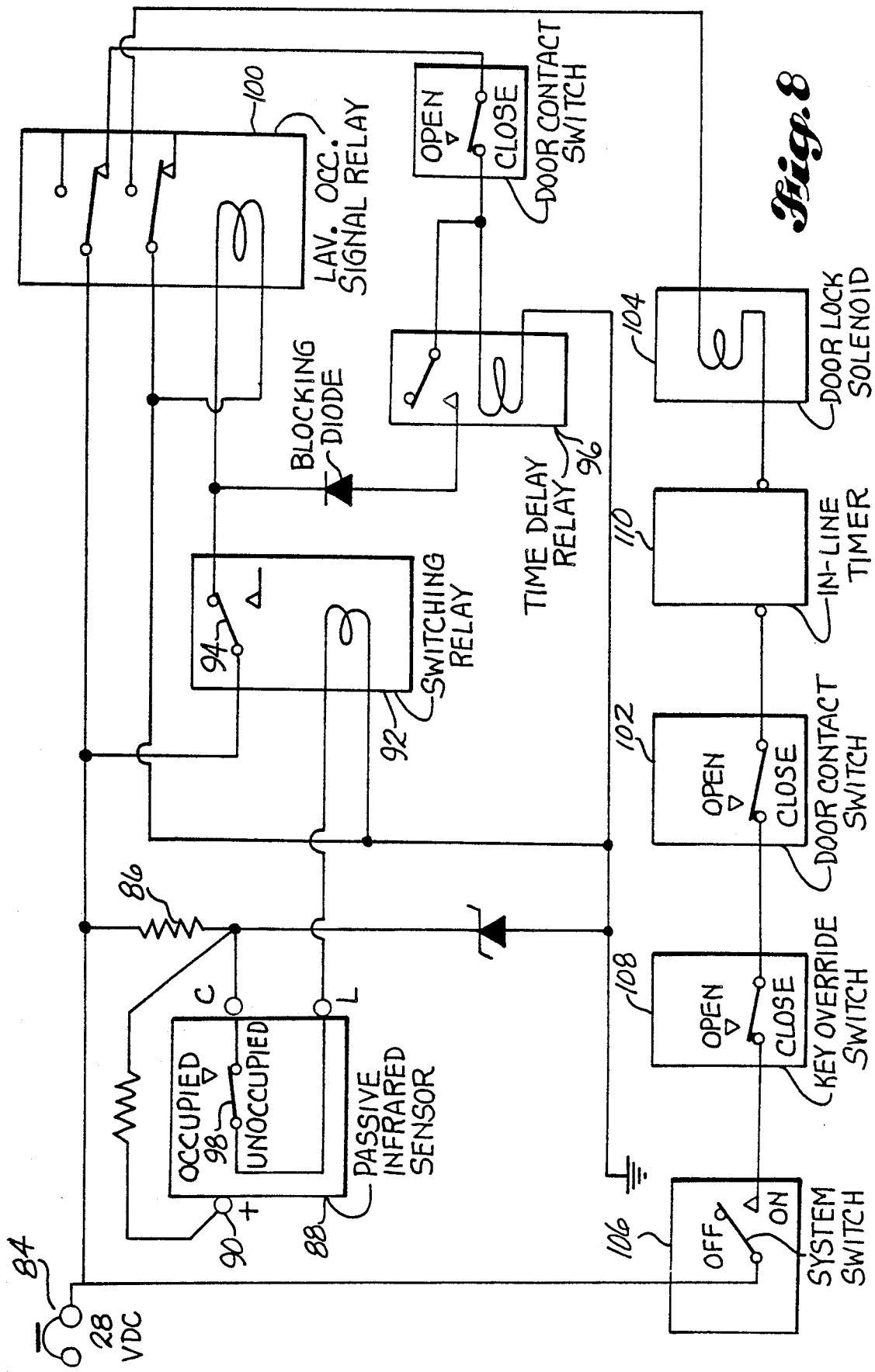
FIG. 8 is a schematic diagram of the control circuitry for a preferred embodiment of the subject door locking system.

The operation of the subject system is controlled by a circuit shown diagrammatically in FIG. 8. The system is primarily powered by 28 volt DC aircraft power source 84. The voltage is dropped across resistor 86 to the passive infra-red sensor circuit 88. The sensor has a secondary battery power supply 90 which is recharged continually so long as the airplane power is available. Infra-red sensor 88 drives a relay 92 which opens a switch 94 when it senses the presence of a person by detecting heat and/or motion, and closes it when there is no heat or motion sensed. The cycle time of the circuit is about two seconds which is determined by the time delay relay 96.

When the sensor switch is closed 98, it provides power to the switching relay which opens switch 94. Opening switch 94 provides power to lavatory occupied signal relay 100 which in turn powers the door locked solenoid time delay relay 96 when the door contact switch 102 indicates the door is closed. Closing the lavatory occupied signal relay causes the door locks solenoid 104 to be powered if the system switch 106 has been turned on by the crew, key override switch 108 is closed and inline timer 110 has cycled. Inline timer 110 delays the door lock solenoid 104 long enough to allow the bifold door to stop vibrating, making sure that the lock plate extends through the slot in the door channel and latch plate.

Once the system has been electronically activated, it continues to function until system switch 106 is turned from the on to the off position. The crew can use the door by inserting a key in the barrel of the lock which overrides the door lock switch 108, deactivates the door lock solenoid 104, and allows entry. The lavatory occupied sign remains on so long as the system is activated.

While this preferred embodiment of the invention has been described in terms using a key and lock entry, any other suitable locking means may be used. For example, a number pad coded lock or other combination lock could be employed.

While our invention has been described in terms of specific embodiments thereof, other forms could be readily adapted by one skilled in the art. For example, like locking means and circuitry could be used in any situation where it is desired to lock a door from a remote location without inadvertently trapping someone inside. Therefore, the scope of the invention is to be limited only in accordance with the following claims.

We claim:

1. A system for locking a door from a remote location comprising:
    a system switch for activating said system;
    means for sensing the presence of a person in the area behind said door;
    means for locking said door when the presence of said person is not sensed by said sensing means;
    means for overriding said locking means to open said door; and
    wherein said system remains active until said system switch is turned off.

* * * * *